April 27, 1965

G. R. NACCI ETAL 3,179,975

MACHINE

Filed July 10, 1962

INVENTORS
GEORGE RAYMOND NACCI
RICHARD DONALD REGO

BY *Lynn Barrett Morris*

ATTORNEY

April 27, 1965   G. R. NACCI ETAL   3,179,975
MACHINE
Filed July 10, 1962   5 Sheets-Sheet 5

INVENTORS
GEORGE RAYMOND NACCI
RICHARD DONALD REGO
BY Lynn Barratt Morris
ATTORNEY United States Patent Office 3,179,975
Patented Apr. 27, 1965

3,179,975
MACHINE
George Raymond Nacci and Richard Donald Rego, Wilmington, Del., assignors to E. I. du Pont de Nemours and Company, Wilmington, Del., a corporation of Delaware
Filed July 10, 1962, Ser. No. 208,715
11 Claims. (Cl. 18—1)

This invention relates to a novel machine for forming clear images in an opaque pressure-clearable film.

In Bechtold U.S. Patent 2,957,791 there are disclosed various methods for forming clear images of printing reliefs. These methods include pressing the pressure-clearable surface of the films disclosed in said patent against a copper engraving, placing the films in a typewriter, without an inking ribbon, and typing directly on it. The pressure clearable films can be placed against the surface of a block of type in a proofing press and the roller passed over the assembly to form a clear image of the type in said film. The clear image-bearing elements obtained by these methods can be post-densified and used as negatives for photoprinting, e.g., as negatives for making photopolymer printing plates.

An object of this invention is to provide a new and dependable machine for forming clear images in opaque pressure-clearable films. Another object is to provide such a machine that will readily provide clear images of line or halftone printing forms. Yet another object is to provide such a machine that is simple to operate and has a small number of parts. A further object is to provide such a machine that will not injure the film and will faithfully reproduce fine detail in printing forms. A still further object is to provide such a machine that is essentially automatic in its operation. Still additional objects will be apparent from the following description of this invention.

The image forming machine of this invention, in one practical aspect, comprises a bedplate, adapted to receive a printing form, having spaced guide rails on its upper surface, a carriage above said bedplate having supporting wheels that roll on said rails, said carriage having a lateral frame extending between and above the guide rails and carrying a vibrator unit that vibrates along a vertical axis, a lateral support block suspended from said vibrator unit having a plurality of rows of separate impact elements suspended therefrom and capable of free up-and-down and slight oscillatory movement, means for oscillating said support block laterally while simultaneously causing the carriage to traverse on said track, and means for vertically adjusting the horizontal position of the support block whereby the extent of the impact of the pointed elements with the relief surface of the printing block can be adjusted.

The invention and a practical machine embodying the foregoing features will now be described with reference to the accompanying drawings that form a part of this application. In these drawings.

Figure 1:
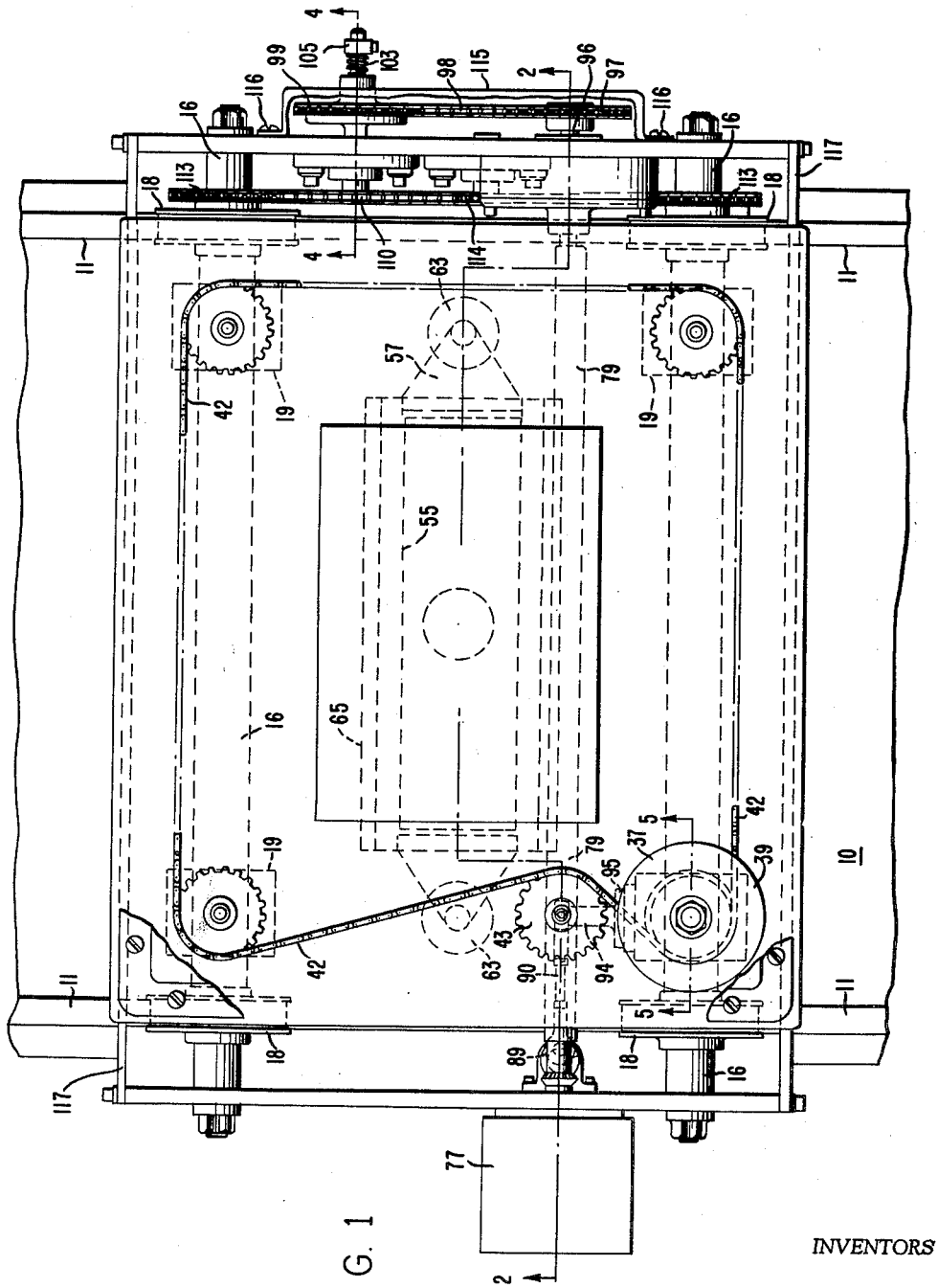
FIG. 1 is a plan view of the image-forming machine.
Figure 2:
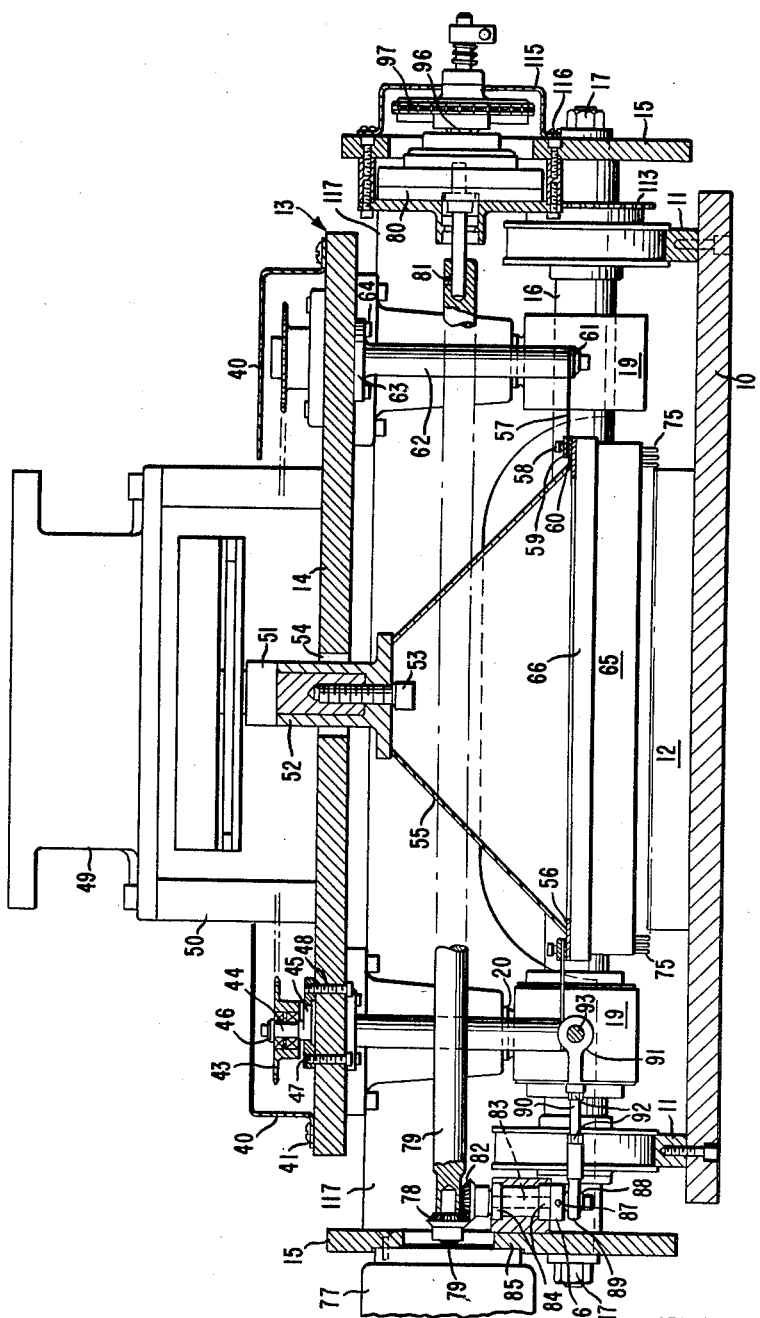
FIG. 2 is a front elevation of said machine, with parts in section, taken along the line 2—2 of FIG. 1.
Figure 3:
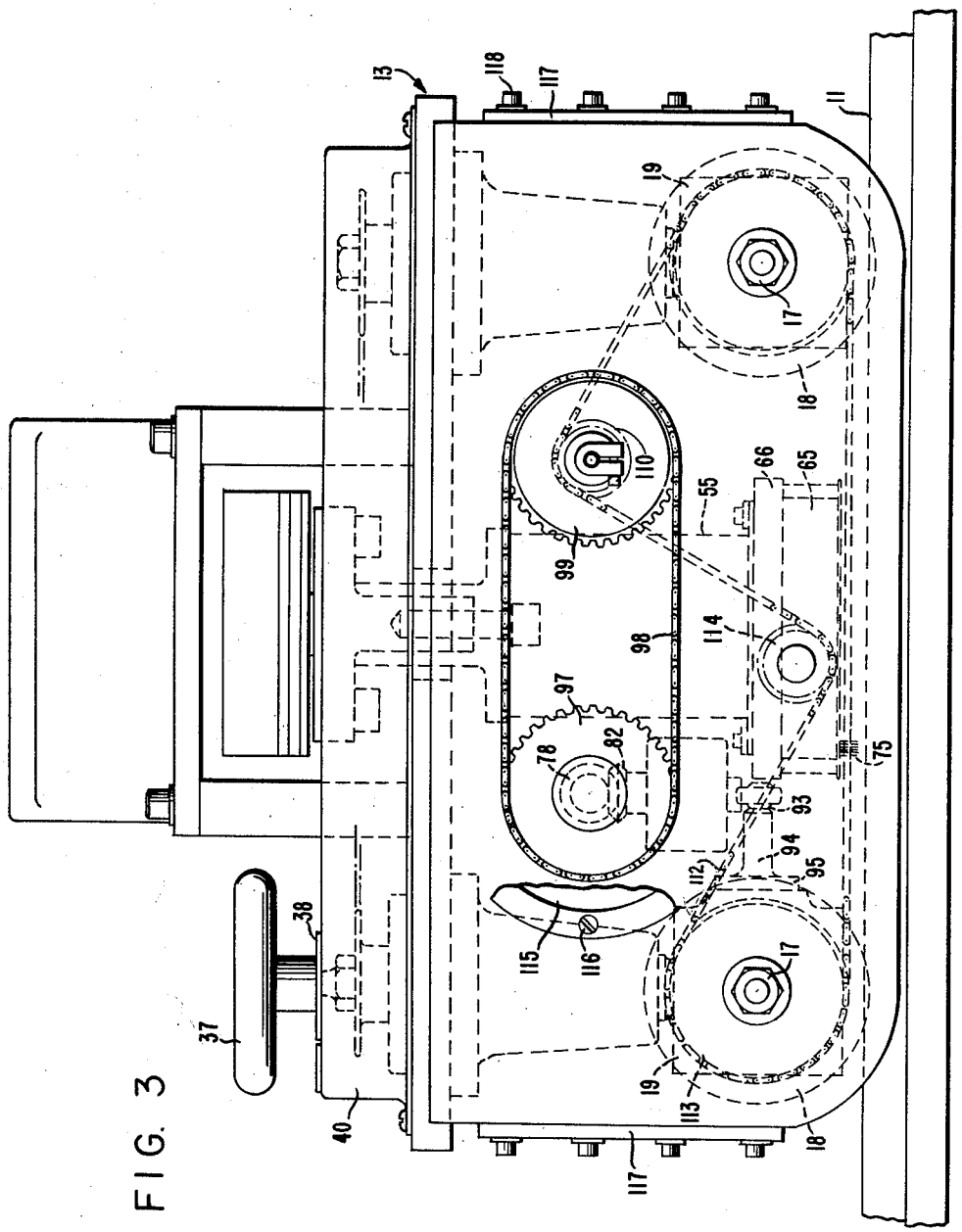
FIG. 3 is a side elevation of the machine.
Figure 5:
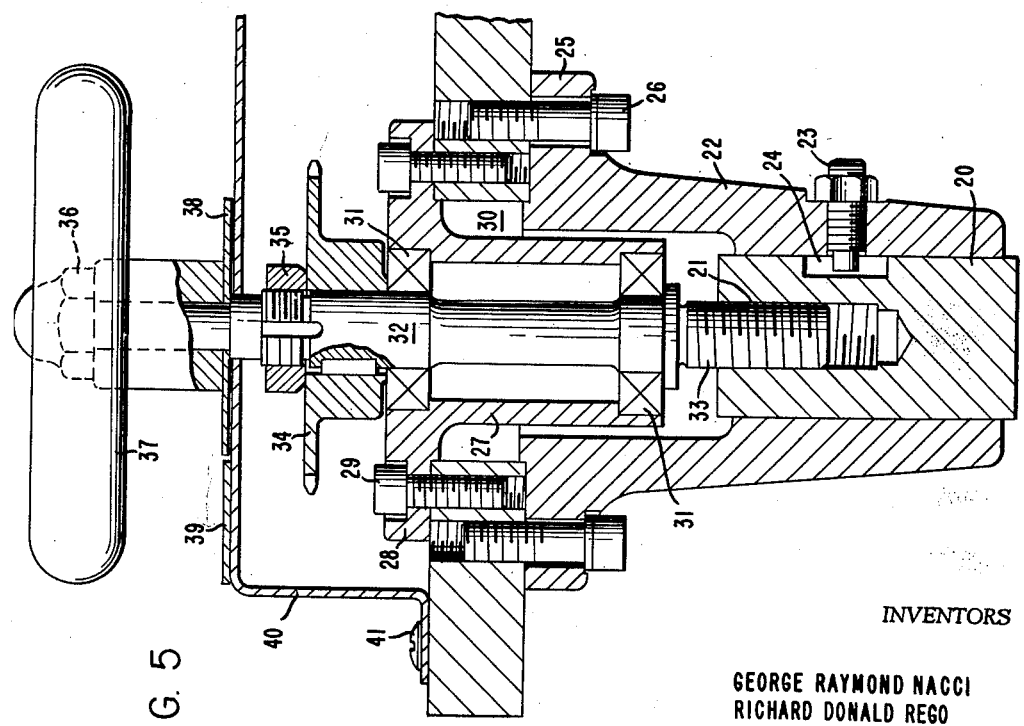
FIG. 5 is a cross section of the adjusting handle and related parts taken along the line 5—5 of FIG. 1.

With particular reference to FIGS. 1, 2 and 3 of the drawings, the machine comprises a horizontal bedplate 10 having on its upper surface, spaced guide rails 11 between which there is placed a relief printing form 12 which can be fastened to the bedplate in any suitable manner. Carriage 13 which is disposed above and in operative relationship with the bedplate embodies a horizontal frame 14 and spaced, separate side plates 15 through which extend fixed axles 16. These axles are fastened to the sideplates by means of locking nuts 17.ABCD Wheels 18 are rotatably mounted on the axles and interfit with and roll along the guide rails. There are also mounted on the lateral fixed axles bearing blocks 19 having upwardly extending trunnions 20 that have a central screw threaded socket 21. In FIG. 5 the trunnion on each bearing block interfits with a vertical hanger 22 and is fastened thereto by means of a limit stop 23 extending through the hanger and the inner end of this limit stop extends into a suitable groove 24. The hanger has a horizontal base flange 25 which is fastened to the bottom surface of the horizontal frame of the carriage by means of bolts 26.

Directly above the hanger and trunnion is a coacting vertical journal 27 that has an outwardly extending horizontal flange 28 that is fastened to the upper surface of the horizontal frame by means of suitable bolts 29. Each vertical journal extends through a suitable respective opening 30 in the horizontal frame. Each vertical journal is provided with spaced antifriction bearings 31, one of which is at the lower end of the journal and the other at the upper end. A spindle 32 has spaced bearing portions which interfit with the antifriction bearings and the lower end 33 of this spindle is threaded for engagement with the threaded socket 21. A sprocket 34 is keyed to the spindle immediately above the upper antifriction bearing and adjacent the flange of the vertical journal. This sprocket is held in position by means of a threaded collar 35 which interfits with suitable threads on the spindle. Fastened to the upper end of the spindle by means of a suitable cap screw 36 is vertical adjusting handle 37. A suitable dial 38 is fastened to the spindle and turns with any rotation of the handle. An index finger 39 coacts with the dial. This index finger is mounted on a cover 40 which encloses the parts carried by the carriage with the exception of the vibratory motor which is described in more detail later. The cover is fastened to horizontal frame 14 by means of screws 41.

As shown in FIG. 1, there are four spindles and each of them is provided with a sprocket and a threaded collar but three of the spindles need not have an adjusting handle or dial. A chain 42 meshes with each of the sprockets on the four vertical spindles which, in turn, meshes with an idler sprocket 43 that is mounted on pintle 44 on eccentric 45 and the sprocket is held in place by nut 46 which has threaded engagement with the top of the pintle. The eccentric is held in position by a coacting collar 47 that is fastened to the horizontal frame by suitable bolts 48. These parts are shown in FIG. 2.

A vibratory motor 49 is mounted on the horizontal frame of the carriage by means of vertical support members 50 which are bolted, welded, or otherwise affixed to the horizontal frame and to the body of the vibratory motor. A trunnion 51 that is fastened to the bottom of the vibratory motor interfits with a boss 52. The boss, in turn, is fastened to the trunnion on the vibratory motor by means of a bolt 53 which extends through the base of the boss and has threaded engagement with the trunnion. The head of this bolt abuts the coacting surface of the boss. The trunnion and interfitting boss extend through a hole 54 in the horizontal frame and allow the latter to oscillate along a vertical axis through said hole. An oscillatory frame 55 is fastened to the boss in any suitable manner, e.g., by weldments, bolts or screws, and the frame is of a flared construction, that is, it is wider at the bottom than at the top where it is fastened to the boss. The oscillatory frame has a horizontal bottom flange 56 to which there are fastened flat springs 57 by means of suitable machine screws 58. These screws extend through retaining members 59, shims 60 and coacting holes near the inner ends of the flat springs. The outer end of each flat spring is provided with a hole through which bolt 61 passes and fastens the spring to depending post 62. This post has a base flange 63 through which there extend suitable bolts 64 for fastening the post to the bottom surface of the horizontal frame.

Figure 6:
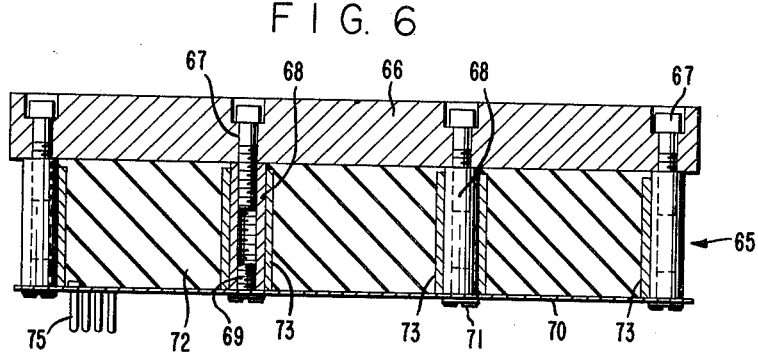
FIG. 6 is a vertical section of the support block for the impact elements.
Figure 8:
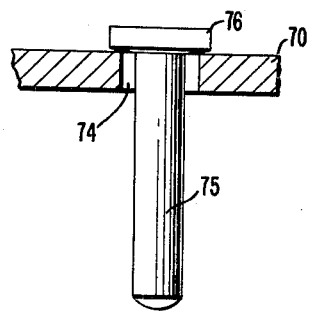
FIG. 8 is an enlarged elevation of a pointed impact element suspended in an opening in the support block.

There is fastened to the lower surface of the bottom flange of the oscillatory frame a head 65 (see FIG. 6) which carries a plurality of pointed impact elements. This head consists of an upper plate 66 through which there extend a plurality of machine screws 67 which are placed in countersunk sockets in the upper surface of said plate. Screws 69 extend through bottom plate 70 and threadably engage the stanchions 68, the heads 71 of the lower screws pressing against the bottom surface of the perforated plate. The space between the plates is preferably filled with resilient material 72, e.g., foam rubber polyurethane foam or other elastomeric material or pneumatic pads or bags, either sealed or having suitable valves. Pneumatic pressures up to five pounds per sq. in. are suitable. As shown in FIG. 6, the divider strips 73, which are preferably made of metal, are placed adjacent to the interfitting screws and divide the resilient material into separate compartments. Extending through each of the perforations 74 in the bottom plate are pointed impact elements 75. The heads 76 thereof are of greater diameter than that of the perforations and the bottom surfaces of these heads slope so that the impact members can oscillate a small degree from the vertical axis on which they can move upwardly and downwardly (see FIG. 8). The pins are not necessarily firmly held during the downward vibratory strokes. The head may contact with the resilient backing and the pins be driven at the same frequency as the vibratory unit.

An electric motor 77, as shown in FIG. 2, is attached to the left sideplate. On the shaft of this motor there is attached a bevel gear 78. The motor shaft is also keyed to a long drive shaft 79. The other end of the long drive shaft is coupled to the shaft of a suitable reduction gear unit 80 by means of a set screw 81 that holds the latter shaft in a socket in the end of the long drive shaft.

The beveled gear that is driven by the motor meshes with a coating bevel gear 82 on vertical jackshaft 83 mounted in antifriction bearings 84 in bearing block 85 which is fastened to the sideplate. The jackshaft is held in place by collar 86 by means of locking pin 87. The bottom end of the jackshaft has a crank end 88 which interfits with swivel 89 which is adjustably mounted on connecting rod 90. Connecting rod 90 joints the first-mentioned swivel to a second swivel 91 which is turned at right angles to the first swivel and is also adjustably mounted on the connecting rod. The two swivels, after adjustment, are maintained in position by locking nuts 92. The second swivel interfits with ball head 93 on the end of lateral arm 94, the base 95 of which is attached to bearing block 19 (see FIGS. 1 and 3).

Figure 4:
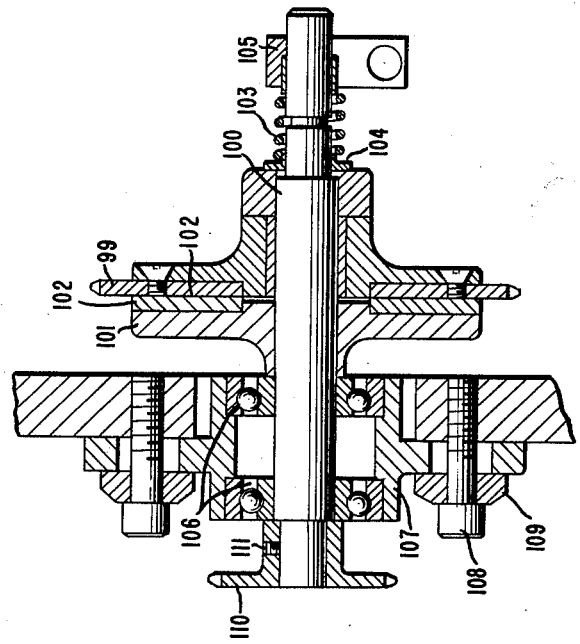
FIG. 4 is a cross-sectional view of the slip clutch and related parts taken along the line 4—4 of FIG. 1.

The drive shaft 96 of the reduction gear unit 80 has fastened thereto a sprocket 97. Chain 98 meshes with this sprocket and with sprocket 99 which rotates on stub shaft 100 extending from and forming a part of clutch 101. Clutch face 102 presses against the coacting surface of the sprocket. The face of the sprocket is pressed against the clutch base by means of spring 103 that surrounds the outer reduced end of the stub shaft and abuts inner washer 104 and outer collar 105 that is attached to said stub shaft. As shown in FIG. 4 the clutch shaft is mounted in antifriction bearings 106 which are mounted in a suitable journal plate 107 that is fastened to the sideplate of the carriage by means of bolts 108 that have threaded engagement with the sideplate and pass through washers 109. The antifriction bearings are also held in place by means of sprocket 110 which is fastened to the outer end of the shaft of the clutch and held in position by means of set screw 111. A second chain 112 meshes with this sprocket and with sprockets 113 that are attached to wheels 18 on the carriage. The chain also meshes with adjustable idler sprocket 114 that is fastened to the sideplate of the carriage in any suitable manner. For instance, it can be mounted like the idler sprocket for chain 42.

As a safety measure, a cover 115 can enclose the sprockets and chains on the endplate. This cover can be fastened to the endplate by screws 116. Cover plates 117 as shown in FIG. 3 can be fastened by screws 118 to the sideplates of the carriage to enclose the various gears and moving parts. The front and rear cover plates have a cut-away portion in the area of the head and printing form so that the operation of the impact elements can be observed.

The apparatus as shown can be provided with a suitable switch or switches for actuating the motor 77. In addition, limit switches can be fastened to the rails or to the bedplate so that they will be tripped or actuated when the wheels on the carriage arrive at certain predetermined positions.

In operating the machine of this invention as exemplified in the drawings, the printing form is placed on the bedplate and fastened to it by any suitable means. A pressure-clearable film is extended over the relief surface of the printing form. It can be taped to the printing form or to the bedplate by a suitable pressure-sensitive adhesive tape. Alternatively, the film can be held in place by vacuum, by placing a vacuum frame around the form and on the bedplate. A thin transparent sheet, e.g., a polyethylene terephthalate film can be placed in contact with the pressure clearable film and draped over the vacuum frame. Air can then be withdrawn in the space between the vacuum frame, the printing form and the pressure-clearable film or protective cover sheet in any suitable manner. For example, by a vacuum pump and by providing suitable connecting passages and hoses or conduits for withdrawing air by said pump.

The height of the ends of the impact elements with respect to the plane of the surface of the relief is then adjusted by turning the adjusting handle to the desired point on the dial. The electric motor and vibratory motor are then actuated, whereby the oscillatory frame vibrates along a vertical axis while it is moving back and forth along a horizontal axis. At the same time wheels 18 rotate through the gears, sprockets and chains and traverse along the guide rails. As the wheels reach the end of the travel, the motor can be reversed automatically by means of limit switches and the wheels and carriage will return to the initial positions. This cycle can be repeated as required to produce an adequate clear image in the pressure clearable film by the points of the impact elements striking the upper surface of the pressure-clearable film or the protective cover sheets.

The carriage can be stopped at any desired position along the rails, for instance near the end of the backward travel position, by grasping the carriage by hand. The clutch will slip until the restraining force is removed. This is accomplished, for example, by a 60–80 r.p.m. driving motor and about a 100 to 1 reduction gear unit, etc. so that the wheels turn at $\frac{1}{10}$ to 1 r.p.m.

After the image is of the desired optical density (clear) the motor and vibratory motor are deactuated and the image-bearing film is removed from the printing form.

The various structural parts of the machines can be made of conventional materials of construction. The bedplate can be made of wood including laminated wood but preferably is made of metal, which can be a steel plate or cast metal, e.g., iron or aluminum. For most of the other parts and members, steel, steel alloys, brass, aluminum, aluminum alloys and, in some cases, high-strength plastic materials, e.g., polyacetal resins, glass fiber laminates, nylon, etc. can be employed. The separate impact members, which are preferably rigid, can be made of steel, wear-resistant alloys, e.g., hardened beryllium-copper alloys or steel alloys. The points where wear occurs can be plated or coated with hard, abrasion-resistant material, e.g., chromium, rhodium, tungsten carbide or stellite; or hard-anodized, in the case of aluminum.

Various types of vibratory motors are available commercially, and electrically energizable vibratory motors are disclosed in U.S. Patents 2,180,189 and 2,187,719, 2,206,244, 2,472,637 and 2,539,391, and can be used for the machines of this invention. In place of these vibratory units an electric motor with an eccentric and a crank arm or arms can be substituted, said arm or arms being attached to suitable pivots on the block containing the impacting elements. Other linkages can be used in place of crank arms.

Various lamps can be provided on the machine so that its operation can be observed. Also, it can be provided with automatic time controlled devices for limiting the duration of cycles.

Various types of opaque pressure-clearable films can be used in the apparatus of this invention. As previously stated, suitable pressure-clearable films are described in Bechtold U.S. Patent 2,957,791. Other useful supported and unsupported pressure-clearable films are described in U.S. Patents 2,846,727, 2,848,752, and in assignee's U.S. application Ser. No. 63,953, Oct. 21, 1960.

The opaque pressure-clearable films described in Bechtold U.S. Patent 2,957,791 and in the Bechtold patents referred to therein, have also been called opaque pressure-clarifiable or pressure-coalescible films, but are more aptly termed opaque pressure-clearable films since the opaque areas which are highly opaque are converted by means of pressure into clear areas readily transparent to visible light. The films are also clearable by heat and by heat and pressure.

The pressure-clearable films or coatings of the Bechtold patents which constitute preferred materials for use in this invention are porous, opaque, non-fibrous, of low bulk density and are composed of partially coalesced discrete particles of a hydrophobic organic addition polymer having a wholly carbon chain, a molecular weight of at least 10,000 and being taken from the group consisting of vinyl and vinylidene addition polymers, said film having an open-cell structure characterized by microscopic voids communicating with the surface and containing 20% to 80% by volume of open-cell pores, said film having a permeability to water vapor of at least 10 times greater than that of corresponding non-porous films of the same polymer and thickness, the opacity per unit of thickness being such that a film thickness of 3 mils and greater has a light-transmission of less than 10% at 4000 A., and increased light transmission at longer wavelengths of light, said film being capable of sustaining a permanent reduction in thickness of at least 20% together with substantial clarification of opaqueness under a pressure of 10,000 pounds per square inch at room temperature. These films are more fully described and defined in Bechtold U.S. Patent 2,957,791 which constitutes part of this disclosure.

After the clarified, or clear, images are formed in the opaque pressure-clearable films by using the machines of this invention, the opaque background area can be increased in optical density by deposition of opaque material in such areas to provide a high-contrast image-bearing layer. These areas being porous are readily coated or impregnated with colorants which fill the open cell voids. Any of the postdensification procedures described in assignee's Bechtold U.S. application Ser. No. 63,953 can be used. Thus, the selectively clarified coating can be post-densified in unchanged opaque background areas by in situ deposition of lead sulfide at 50° C. by immersing the coating in aqueous lead nitrate and sodium sulfide solutions with intermediate blotting with porous cardboard, washing in water and drying which gives a dense, black background. Alternatively, the background areas can be post-densified by dyeing for several minutes with 2.5% aqueous solution of an after-chromed dye, Colour Index No. 15,710, at 50° C. for several minutes.

While the dimensions, mass, amplitude of vibration, etc. of the impact elements may vary, it appears that, for steel elements, the following specifications are desirable:

|  | Minimum | Maximum |
| --- | --- | --- |
| Length (inches) | ⅛ | ½ |
| Mass (grams) | .056 | 0.152 |
| Radius at "point" (inches) | .010 | .035 |

With the smaller of these elements, an amplitude of vibration of about 0.1 inch and an "engagement" or maximum drop below the printing surface of 0.075 inch will clarify a spot having a diameter of about .002 inch. The larger of these elements vibrated at an amplitude of .025 inch and an "engagement" of .030 inch will clarify a spot having a diameter of about .007 inch. The larger the impacting element, the smaller should be the amplitude of vibration and "engagement" in order to prevent damage to the printing plate. However, considerable variation within these limits is permissible and two satisfactory sets of conditions are as follows:

| Element Length, inches | Mass, g. | Radius of Point, inches | Amplitude of Vibration, inches | Engagement, inches | Clarified Spot Diameter, inches |
| --- | --- | --- | --- | --- | --- |
| ⅜ | 0.120 | .025 | 0.040 | .025 | .0055 |
| ⅛ | .045 | .025 | 0.088 | .045 | .0055 |

If lighter materials are used for the impact elements, both the size of the elements and amplitude of vibration may be increased. If the impact elements have no oscillatory movement in the block, the spot diameters can be as given above. With oscillatory movement in the block, the spot diameters can be increased. While the impact elements are shown as being cylindrical with rounded points or ends, they can have other shapes. For example, they can be square, hexagonal, or oval. The ends, however, should not have sharp points or corners but should be smooth and slightly curved.

The invention is, of course, not limited to the specific construction shown above as instead of oscillating means for moving the head in a horizontal plane, a screw or other adjustment could be used so that the position of the head could be adjusted incrementally during vertical vibratory movement. Also, instead of rails, the wheels could operate in grooves or between guides. Other traversing means for moving the carriage back and forth could be substituted.

The novel machines of this invention have the advantage that they are of rugged construction and are quite dependable in operation over long periods of operation. In addition, they can be assembled rather quickly and without special tools. The electric motors and vibratory motors are commercially available.

Another advantage of the machine is that the position of the pointed impact elements can be adjusted quickly and accurately, this leading to control of clear image formation. Upon wear of the impact elements, a new vibratory head containing such elements can be quickly substituted and the previous head dismantled and the worn pointed impact elements replaced. A further advantage of the machines is that uniform coverage of the entire surface of the relief to be reduced is insured. The machine admits of rapid conversion of an opaque film to a clear photographic transparency, accurately reproducing as a clear image all of the fine detail of the relief. The apparatus has an additional advantage that it does not damage the surface of the relief or type form and gives an adequate, clear image in an opaque pressure-clearable film in a short time. It avoids the use of heavy pressure rollers such as those used in pulling a proof from a bed of type which often damages the type surface and cannot be successfully used where fine rulings are in the printing surface.

Figure 7:
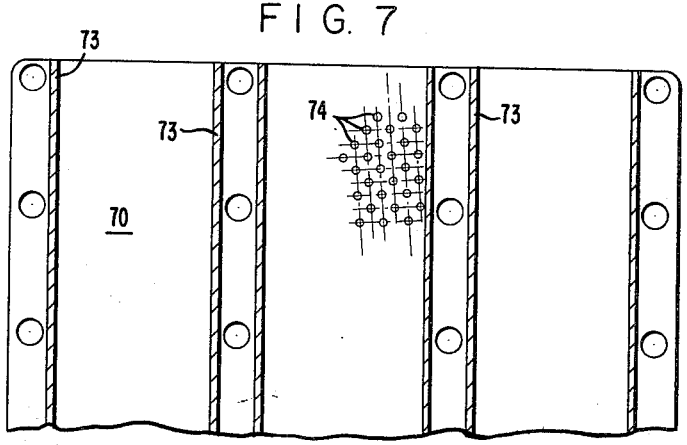
FIG. 7 is a bottom plan view of the support block.

A further advantage is that by varying the arrangement of the perforations in the block one can vary the impact pattern. As shown in FIG. 7, the perforations are disposed about 4° from the longitudinal centerline of the machine for the purpose of reducing a repetitive pin pattern.

A very important additional advantage of this invention is that it does not emboss (permanently deform) the supporting film base. Still another advantage is that it is capable of handling type forms whose relief images are not co-planar. Still further advantages will be apparent from the foregoing description and accompanying drawings.

What is claimed is:

1. An image-forming machine comprising a bedplate adapted to receive a printing form, a carriage above said bedplate and adapted to traverse along said bedplate, said carriage carrying a vibratory unit that vibrates along a vertical axis, a support block operatively associated with said unit having a plurality of rows of impact elements suspended therefrom and capable of free up-and-down and oscillatory movement, and the ends of said elements adapted to contact with the plane of the surface of said printing form.

2. A machine according to claim 1 wherein the impact elements are of small cross-section and the ends are curved.

3. A machine according to claim 1 having means for oscillating said support block laterally.

4. An image-forming machine which comprises a bedplate adapted to receive a printing form, a carriage above said bedplate having supporting wheels that traverse along said bedplate, said carriage having a lateral frame carrying a vibratory unit that vibrates along a vertical axis, a lateral support block suspended from the vibratory unit and having a plurality of rows of impact elements suspended therefrom and capable of free up-and-down and slight oscillatory movement, and means for vertically adjusting the horizontal position of the support block whereby the extent of the impact of the pointed elements with respect to the relief surface of the printing form can be adjusted.

5. An image-forming machine according to claim 4 having means for oscillating said support block laterally while causing said carriage to traverse along said bedplate.

6. An image-forming machine according to claim 4 having means whereby the carriage can be stopped while traversing along said bedplate without interrupting the action of the vibratory unit or the means for oscillating the support block laterally.

7. An image-forming machine according to claim 4 having guide rails on said bedplate and said wheels being adapted to roll on said guide rails.

8. An image-forming machine which comprises:

(1) a horizontal bedplate adapted to receive a printing form having spaced guide rails on its upper surface,
(2) a carriage above said bedplate having a horizontal frame extending between and above the guide rails and carrying
(3) a vibratory unit that vibrates along a vertical axis,
(4) a lateral support block suspended from said vibratory unit, having a plurality of pointed impact elements suspended therefrom and capable of free up-and-down and slight oscillatory movement,
(5) vertical sideplates adjacent the sides of the horizontal frame,
(6) spaced fixed axles attached to and extending between said sideplates,
(7) supporting wheels rotatably mounted on said axles and adapted to roll on said rails,
(8) bearing blocks journaled on said axles and adjustably connected to said horizontal frame of the carriage,
(9) means on said carriage for simultaneously adjusting the position of the carriage with respect to each of said bearing blocks,
(10) a driving motor attached to one of said sideplates and operatively connected to a drive shaft extending to the other of said sideplates,
(11) a reduction gear and driving mechanism including a slip clutch operatively connected to supporting wheels, and
(12) a crank mounted on a slideplate, driven by said motor and linked to one of said bearing blocks whereby said horizontal frame can be oscillated along a horizontal axis.

9. A machine according to claim 8 wherein the vibratory unit can be actuated independently from the means for oscillating the support block laterally.

10. A machine according to claim 8 having means whereby the carriage can be stopped while traversing on said guide rails without interrupting the action of the vibratory unit or the means for oscillating said support block laterally.

11. An image-forming machine according to claim 8 wherein the impact elements are restrained in their up-and-down movement by means of resilient material placed against the heads of said elements.

References Cited by the Examiner

UNITED STATES PATENTS

| 2,325,752 | 8/43 | Dodge | 18—19 |
| 2,513,581 | 7/50 | Moule | 18—19 |
| 2,688,775 | 9/54 | Scherer et al. | 18—56 |
| 2,979,776 | 4/61 | Morin | 18—56 |
| 3,113,342 | 12/63 | Halpern et al. | 18—1 |
| 3,118,178 | 1/64 | Alles | 18—1 |

References Cited by the Applicant

UNITED STATES PATENTS

| 2,187,717 | 1/40 | Weyandt. |
| 2,398,777 | 4/46 | Burke. |
| 2,463,448 | 3/49 | Weyandt. |
| 2,494,075 | 1/50 | Weyandt. |

MICHAEL V. BRINDISI, *Primary Examiner.*

LESLIE H. GASTON, WILLIAM J. STEPHENSON,
*Examiners.*